United States Patent Office 3,274,251
Patented Sept. 20, 1966

3,274,251
PRODUCTION OF UNSYMMETRICAL
DIMETHYLHYDRAZINE
Paul Besson, La Chambre, Savoie, and Gilbert Luiset, Saint-Etienne-de-Cuines, Savoie, France, assignors to Societe d'Electro-Chimie d'Electro-Metallurgie et des Acieries Electriques d'Ugine, Paris, France, a French company
No Drawing. Filed May 31, 1963, Ser. No. 284,306
Claims priority, application France, Aug. 17, 1962, 907,177
7 Claims. (Cl. 260—583)

The present invention pertains to a process for producing unsymmetrical dimethylhydrazine by the sodium reduction of dimethylnitrosoamine in a hydroorganic reaction medium.

The preparation of unsymmetrical dimethylhydrazine by the reduction of dimethylnitrosoamine has already been proposed according to the following reaction sequence:

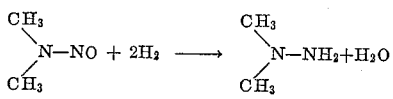

To carry out this reduction it has been proposed to use aluminum or zinc in the form of powder or shot in an aqueous alkaline medium, or to use powdered zinc suspended in aqueous acetic acid.

These known processes, although producing satisfactory results, are nonetheless subject to a certain number of disadvantages of which the most prominent are the following:

In the first case, in which powdered or granulated aluminum or zinc is used in an aqueous alkaline medium, it is necessary to take great precautions for safety in view of the danger that the reaction will become cumulative and get out of control. Moreover the recovery of unsymmetrical dimethylhydrazine contained in the reaction medium presents difficult problems in view of the complexity of this medium, comprising as it does a mixture of unsymmetric dimethylhydrazine, water, sodium hydroxide, sodium aluminate and hydrated aluminum oxide all in suspension.

The second above-mentioned method which employs powdered zinc in aqueous acetic acid (or any aqueous acidic medium) is awkward because, in order to recover the unsymmetrical dimethylhydrazine, it is necessary first to liberate the dimethylhydrazine by adding sufficient sodium hydroxide to netralize all of the acetic acid which is present in the reaction medium.

Lastly, in neither case is it easy to effect an economically advantageous recovery of the sodium aluminate or sodium zincate from the residual liquors. In consequence, unsymmetrical dimethylhydrazine prepared by either of these processes is high in cost.

The present invention effects a substantial suppression of these disadvantages.

It is an object of the invention to provide a process for the production of unsymmetrical dimethylhydrazine by the reduction of dimethylnitrosoamine by means of sodium in a hydroorganic solvent under such conditions that upon completion of the reaction the medium comprises two immiscible phases, namely an aqueous solution of sodium hydroxide and an organic solution of unsymmetrical dimethylhydrazine, unreacted dimethylnitrosoamine, and water.

The sodium is introduced into the reaction in the form of particles whose size and shape may vary over a wide range. It may alternatively be introduced in liquid form. The ratio between the quantity employed and the quantity theoretically necessary is between 1 and 2 and may advantageously be approximately 1.2.

The sodium is added a little at a time over a period not exceeding a few hours and comprising usually between two and five hours. Any excess sodium in the reaction mixture may be "destroyed" by the addition of water to the system, resulting in the complete conversion of unreacted sodium to sodium hydroxide.

The aqueous solution of sodium hydroxide resulting from the reaction includes sodium hydroxide in an amount between 100 grams per liter and 800 grams per liter, and usually in the vicinity of 500 grams per liter.

Water is added in such quantity that, apart from the sodium, there will be no other solid in suspension in the reaction medium and further so that the concentration of sodium hydroxide in the aqueous phase will always be as close as possible to 500 grams per liter.

The organic phase is such that the solubility therein of the sodium hydroxide aqueous solutions must be neither too high nor too low, and further such that the solubility therein of the dimethylnitrosoamine or unsymmetrical dimethylhydrazine will be complete, whatever the proportions employed. To this end, one may advantageously use common industrial alcohols such as methanol, ethanol, isopropanol, sec-butanol, methylisobutylcarbinol and the like. However, all other organic compounds satisfying the above-indicated conditions may be employed such as for example the ether oxides such as ethylene oxide, 2-butylene oxide, and amines such as diisopropylamine, triethylamine, etc.

The weight ratio of dimethylnitrosoamine to the sum of dimethylnitrosoamine and organic compound ingredients is, according to the invention, between 0 and 1.

The temperature of operation resides between 0° C. and 100° C. It is advantageously held in the vicinity of about 30° C. to about 50° C.

The reaction may be easily carried out in continuous fashion in a reactor supplied with either fused sodium or with solid sodium particles and with the nitrosoamine and water. From this reaction vessel one may withdraw continuously, after an average residence time between 2 and 5 hours, the organic mixture which is subsequently distilled, while aqueous phase containing sodium hydroxide is withdrawn by decanting. Part of the sodium hydroxide withdrawn is recycled while the remainder is purified by distillation in order to ready it for the market.

The process of the invention presents numerous advantages:

(1) In view of the presence of two immiscible phases it is possible to effect action on the sodium by the water and by the organic compound employed at a relatively low temperature, without the least danger and without risk that the reaction will become cumulative and get out of control.

(2) The existence of two immiscible phases avoids an excessively intimate contact between the sodium hydroxide and the organic products. This has the advantage of producing a particularly high yield.

(3) The recovery of the unsymmetrical dimethylhydrazine is readily effected, it being sufficient to decant the reaction medium so as to separate out the organic phase and then to distill carefully that phase.

(4) The value of the sodium employed is easily recovered in the form of an aqueous sodium hydroxide solution which is readily saleable or otherwise useable since it is of high concentration reaching 500 grams of sodium per liter of solution.

The following non-limitative examples illustrate the process of the invention and will further indicate the advantages thereof:

*Example 1*

426 grams of sec-butanol and 74 grams of dimethylnitrosoamine were introduced into a closed vessel having a capacity of 2 liters and provided with a mechanical agitator, a reflux condenser, a thermometer and cooling means. The weight ratio of dimethylnitrosoamine to the sum of dimethylnitrosoamine and alcohol amounted to 0.148.

The mixture was held at a temperature between 30° and 35° C. and over a period of 4 hours, there were added 106 grams of fused sodium (i.e. 1.15 times the theoretically necessary quantity), and 450 grams of water.

At the end of the reaction, the mix separated into two phases. The first phase was an aqueous layer comprising a solution of sodium hydroxide 400 cc. in volume and having a sodium hydroxide concentration of 442 g./1000 cc. This aqueous layer was moreover perfectly clear and colorless. The second phase took the form of an alcohol layer including 45.45 grams of unsymmetrical dimethylhydrazine as measured by the potassium iodate method.

The yields amounted to 75.7% of the dimethylnitrosoamine introduced and 65.8% of the sodium employed.

Example 2

There were introduced into the vessel described in conjunction with Example 1 the following ingredients:

333 grams of sec-butanol,
37 grams of dimethylnitrosoamine,
53 grams of sodium in the form of cubes of half a centimeter on a side.

The weight ratio of dimethylnitrosoamine to the sum of dimethylnitrosoamine and alcohol was 0.10.

The quantity of sodium employed amounted to 1.15 times the theoretical quantity.

The mixture was subjected to continuous agitation at a temperature between 20° and 30° C. and, over a four-hour period there were added 200 grams of water.

At the end of the reaction, the mix separated into two phases. The first phase was an aqueous layer comprising a solution of sodium hydroxide of 175 cc. volume including NaOH in the concentration of 546 g./1000 cc. and having a perfectly clear and colorless appearance. The second phase was an alcoholic layer including 23.9 grams of unsymmetrical dimethylhydrazine as measured by the potassium iodate method.

The yields were 79.7% with reference to the dimethylnitrosoamine employed and 69.3% by reference to the sodium employed.

Example 3

Into the vessel described with reference to Example 1, there were introduced the following ingredients:

333 grams of sec-butanol,
37 grams of dimethylnitrosoamine,
an aqueous sodium hydroxide solution in a concentration of 500 g./1000 cc. per 100 grams.

The weight ratio of dimethylnitrosoamine to the sum of dimethylnitrosoamine and alcohol was 0.10.

The mixture was held at a temperature not exceeding 50° C. and over a four hour period there were added in successive portions 53 grams of sodium, in the form of fused sodium (i.e., 1.15 times the theoretical quantity), followed by the addition of 200 grams of water.

When the reaction was terminated, the mix separated into two phases:

(a) An aqueous layer comprising a solution of sodium hydroxide amounting to 275 cc. in volume with a sodium hydroxide content of 510 g./1000 cc. and perfectly clear and colorless in appearance.
(b) An alcoholic layer comprising 23.3 grams of unsymmetrical dimethylhydrazine as measured by the potassium iodate method.

The yields amounted to 77.6% by reference to the dimethylnitrosoamine introduced and 67.5% by reference to the sodium introduced.

While the invention has been described herein in terms of a number of examples, it will be understood that the invention is not limited thereto, and that numerous variations are possible within the spirit and scope of the invention as defined in the following claims.

We claim:

1. The process for producing unsymmetrical dimethylhydrazine which comprises preparing a solution of dimethylnitrosoamine in an organic solvent for the dimethylnitrosoamine and said dimethylhydrazine, the weight ratio of the dimethylnitrosoamine to the sum of the dimethylnitrosoamine and said solvent being less than one, contacting said solution with sodium in the presence of water at a temperature in the range between about 0° and about 100° C. to produce hydrogen and sodium hydroxide, thereby concurrently hydrogenating the dimethylnitrosoamine in situ to the unsymmetrical dimethylhydrazine, the amount of water and sodium used being sufficient to produce at least the stoichiometric amount of hydrogen for the hydrogenation, separating the two resultant immiscible liquid phases consisting of an organic phase containing the unsymmetrical dimethylhydrazine and an aqueous phase containing sodium hydroxide solution, and recovering the unsymmetrical dimethylhydrazine from said organic phase.

2. The process for producing unsymmetrical dimethylhydrazine which comprises preparing a solution of dimethylnitrosoamine in an organic solvent for the dimethylnitrosoamine and said dimethylhydrazine, the weight ratio of the dimethylnitrosoamine to the sum of the dimethylnitrosoamine and said solvent being less than one, contacting said solution with sodium in the presence of water at a temperature in the range between about 0° and about 100° C. to produce hydrogen and sodium hydroxide, thereby concurrently hydrogenating the dimethylnitrosoamine in situ to said dimethylhydrazine, the amount of sodium used being in the range from about 1 to 2 times that required to generate the stoichiometric amount of hydrogen for the hydrogenation and the amount of water used being sufficient to produce a final sodium hydroxide solution containing at least 100 gms. of sodium hydroxide per liter of aqueous solution, separating the two resultant immiscible liquid phases consisting of an organic phase containing the unsymmetrical dimethylhydrazine and an aqueous phase containing sodium hydroxide solution, and recovering said dimethylhydrazine from said organic phase.

3. The process for producing unsymmetrical dimethylhydrazine as in claim 2 wherein said organic solvent is selected from the group consisting of methanol, ethanol, isopropanol, sec.-butanol, methylisobutylcarbinol, ethylene oxide, 2-butyleneoxide and diisopropylamine and triethylamine.

4. The process for producing unsymmetrical dimethylhydrazine which comprises preparing a solution of dimethylnitrosoamine in an alcohol which is a solvent for said dimethylhydrazine and said dimethylnitrosoamine, the weight ratio of the dimethylnitrosoamine to the sum of dimethylnitrosoamine and said alcohol being less than one, adding to said solution sodium and water to produce hydrogen and sodium hydroxide at a temperature in the range between about 0° and 100° C., thereby concurrently hydrogenating the dimethylnitrosoamine in situ to said dimethylhydrazine, the amount of sodium used being in the range of about 1 to 2 times that required to generate the stoichiometric amount of hydrogen for the hydrogenation and the amount of water used being sufficient to produce a final sodium hydroxide solution in the range between about 100 gms. and about 800 gms. of sodium hydroxide per liter of aqueous solution, separating the two resultant immiscible liquid phases consisting of organic phase containing said dimethylhydrazine and an aqueous phase containing sodium hydroxide solution, and recovering said dimethylhydrazine from said organic phase.

5. The process for producing unsymmetrical dimethylhydrazine which comprises preparing a solution of dimethylnitrosoamine in an alcohol which is a solvent for said dimethylhydrazine and said dimethylnitrosoamine, the weight ratio of the dimethylnitrosoamine to the sum of dimethylnitrosoamine and said alcohol being less than one, adding to said solution sodium and water to produce hydrogen and sodium hydroxide under atmospheric pressure and at a temperature in the range between about 30° and 50° C., thereby concurrently hydrogenating the dimethylnitrosoamine in situ to said dimethylhydrazine, the amount of sodium used being about 1.2 times that required to generate the stoichiometric amount of hydrogen for the hydrogenation and the amount of water used being sufficient to produce a final sodium hydroxide solution containing about 500 gms. of sodium hydroxide per liter of aqueous solution, separating the two resultant immiscible liquid phases consisting of an organic phase containing the unsymmetrical dimethylhydrazine and an aqueous phase containing sodium hydroxide solution, and recovering the unsymmetrical dimethylhydrazine from said organic phase.

6. The process for producing unsymmetrical dimethylhydrazine which comprises preparing a solution of dimethylnitrosoamine in sec.-butanol, the weight ratio of the dimethylnitrosoamine to the sum of the dimethylnitrosoamine and said sec.-butanol being less than one, adding to said solution sodium and water to produce hydrogen and sodium hydroxide under atmospheric pressure and at a temperature in the range between about 30° C. and 50° C., thereby concurrently hydrogenating the dimethylnitrosoamine in situ to the unsymmetrical dimethylhydrazine, the amount of sodium used being about 1.2 times that required to generate the stoichiometric amount of hydrogen for the hydrogenation and the amount of water used being sufficient to produced a final sodium hydroxide solution having a concentration about 500 gms. of NaOH per liter of aqueous solution, separating the two resultant immiscible liquid phases consisting of an organic phase containing the unsymmetrical dimethylhydrazine and an aqueous phase containing sodium hydroxide solution, and recovering the unsymmetrical dimethylhydrazine from said organic phase.

7. The process of claim 6 in which the sodium in particle form is added into the solution slowly over a period of about 2 to about 5 hours.

References Cited by the Examiner
UNITED STATES PATENTS 3,005,027   10/1961   Druey et al. _____ 260—583

FOREIGN PATENTS 797,483   7/1958   Great Britain.

OTHER REFERENCES

Groggins: "Unit Processes in Organic Syn.," third edition (1947), McGraw-Hill Book Co., Inc., New York, page 488.

CHARLES B. PARKER, *Primary Examiner.*

ANTON H. SUTTO, *Assistant Examiner.*